UNITED STATES PATENT OFFICE.

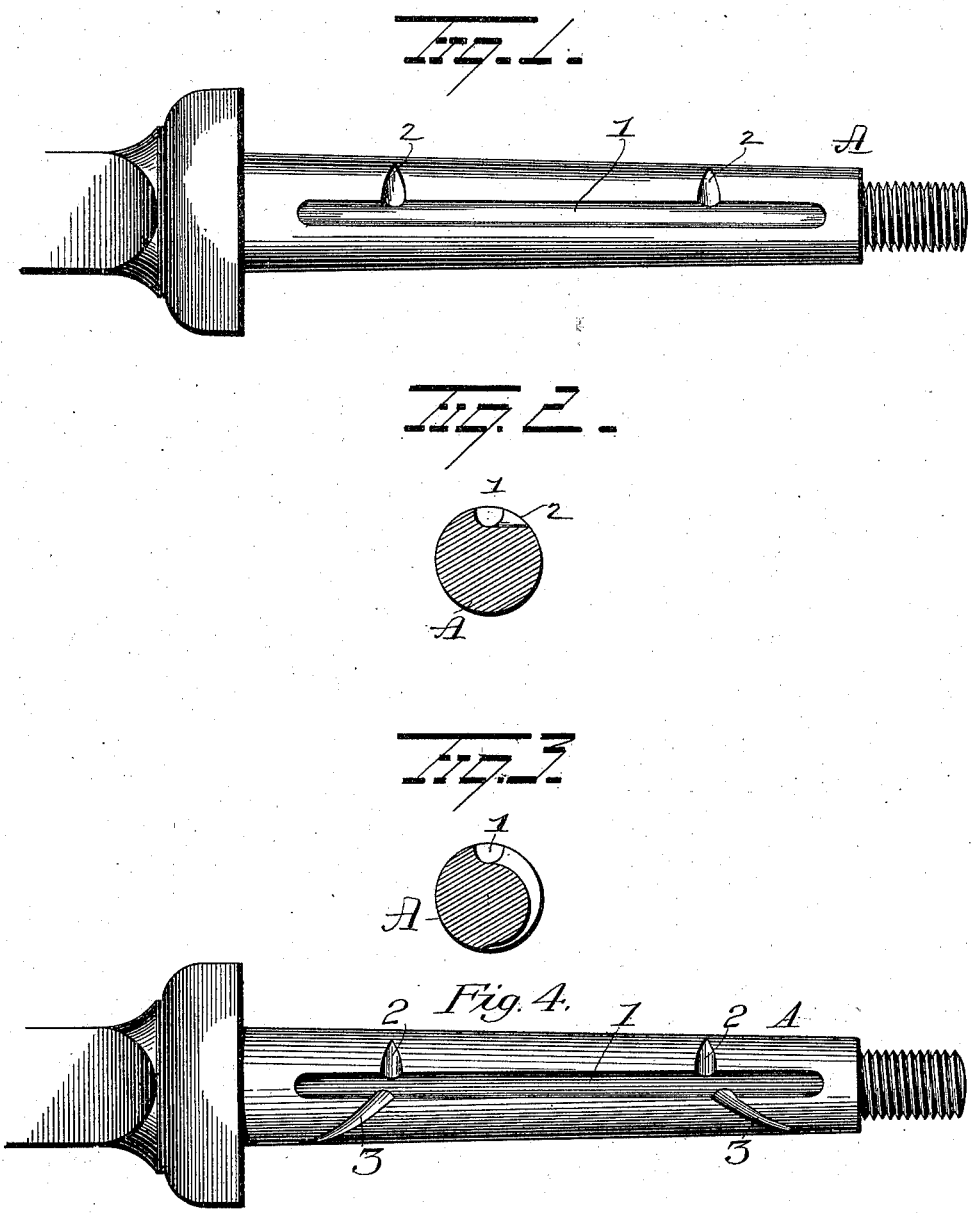

JOHN T. RICHARDS, OF GARDINER, MAINE.

LUBRICATING AXLE-JOURNAL.

SPECIFICATION forming part of Letters Patent No. 575,171, dated January 12, 1897.

Application filed July 25, 1894. Serial No. 518,575. (No model.)

*To all whom it may concern:*

Be it known that I, JOHN T. RICHARDS, of Gardiner, in the county of Kennebec and State of Maine, have invented certain new and useful Improvements in Lubricating Axle-Journals; and I do hereby declare the following to be a full, clear, and exact description of the invention, such as will enable others skilled in the art to which it appertains to make and use the same.

My invention relates to an improvement in axle-journals; and it consists in certain novel features of construction and combination of parts, which will be hereinafter described, and pointed out in the claims.

In the accompanying drawings, Figure 1 is a view of my improved axle-journal. Fig. 2 is a section, and Figs. 3 and 4 are modifications.

A represents an axle-journal having a longitudinal groove 1 formed in its upper surface and terminating within the ends of the journal a sufficient distance to leave unbroken bearings at this point. This groove 1 is designed to serve as an oil-reservoir to receive a certain quantity of oil and discharge it as required for lubricating purposes. An outlet 2 is provided for the distribution of this oil, and this consists in a lateral groove leading from the main groove 1 and as deep as the latter for conducting the oil from the main groove to the surface of the journal. In the construction shown in Fig. 1 this groove leads directly from the main groove 1 to one side until it merges into the surface of the journal, preferably on a level with the bottom of the main groove.

In the modification the lateral groove 4 is continued on around the journal to the bottom thereof, where it merges into the surface of the journal. Of course the length might be varied, the essential feature being that the lateral groove should lead from a point far enough down in the main groove to furnish an outlet for every particle of lubricant contained in the main groove as it is required. This groove being on the surface it is kept closed by the hub-box fitting around it tightly, and when the vehicle is at rest the escape of oil is practically prevented.

In addition to the main and lateral groove or grooves, any number of which might be used, spiral grooves 3 3, as illustrated in Fig. 4, may be used for collecting and returning any superfluous oil finding its way to the ends of the journal to the main groove.

Slight changes might be resorted to in the form and arrangement of the several parts described in other particulars than those referred to herein without departing from the spirit and scope of my invention, and hence I do not wish to limit myself to the exact construction herein set forth; but, Having fully described my invention, what I claim as new, and desire to secure by Letters Patent, is—

1. An axle-journal having a longitudinal groove formed in its upper surface, said groove stopping at its ends short of the ends of the journal and the sides of the groove forming confining-walls whereby the groove constitutes an oil-reservoir, and distribution groove or grooves on the surface of the journal extending laterally from the bottom of the horizontal groove for distributing oil over the surface of the journal, substantially as set forth.

2. An axle-journal having a longitudinal groove in its upper surface the ends of which groove terminate short of the ends of the journal and the sides of which groove constitute retaining-walls whereby the groove forms a reservoir, distributing groove or grooves extending laterally from the bottom of this longitudinal groove, to distribute the oil over the surface of the journal, and returning-grooves for collecting superfluous oil and returning it to the longitudinal groove, substantially as set forth.

In testimony whereof I have signed this specification in the presence of two subscribing witnesses.

JOHN T. RICHARDS.

Witnesses:
A. E. HARMON,
GEO. W. HESELTON,